(12) United States Patent
Kim et al.

(10) Patent No.: US 11,461,475 B2
(45) Date of Patent: Oct. 4, 2022

(54) ELECTRONIC DEVICE INCLUDING SECURE INTEGRATED CIRCUIT

(71) Applicant: Samsung Electronics Co., Ltd., Suwon-si (KR)

(72) Inventors: Bumhan Kim, Suwon-si (KR); Sunjune Kong, Suwon-si (KR); Seongjin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 16/815,541

(22) Filed: Mar. 11, 2020

(65) Prior Publication Data

US 2020/0293667 A1   Sep. 17, 2020

(30) Foreign Application Priority Data

Mar. 12, 2019   (KR) ................. 10-2019-0028203

(51) Int. Cl.
*G06F 21/60* (2013.01)
*G06F 7/58* (2006.01)
(Continued)

(52) U.S. Cl.
CPC ............ *G06F 21/602* (2013.01); *G06F 7/588* (2013.01); *G06F 12/1441* (2013.01);
(Continued)

(58) Field of Classification Search
CPC .. G06F 12/1441; G06F 15/7821; G06F 21/46; G06F 21/602; G06F 21/71;
(Continued)

(56) References Cited

U.S. PATENT DOCUMENTS 9,251,380 B1 *  2/2016  Au .................... G06F 21/78
9,489,540 B2    11/2016  Lee et al.
(Continued)

FOREIGN PATENT DOCUMENTS

KR   10-2016-0019780 A   2/2016
KR   10-2016-0101635 A   8/2016
(Continued)

OTHER PUBLICATIONS

Schellekens D., Tuyls P., Preneel B. (2008) Embedded Trusted Computing with Authenticated Non-volatile Memory. In: Lipp P., Sadeghi AR., Koch KM. (eds) Trusted Computing—Challenges and Applications. Trust 2008. Lecture Notes in Computer Science, vol. 4968 (Springer 2008) (Year: 2008).*

(Continued)

*Primary Examiner* — Theodore C Parsons
(74) *Attorney, Agent, or Firm* — Jefferson IP Law, LLP

(57) ABSTRACT

An electronic device including a secure Integrated Circuit (IC) is provided. The electronic device includes a secure IC configured as a System-on-Chip (SoC) and configured to provide a general environment and a security environment, wherein the secure IC includes a main processor configured to operate in the general environment, a secure processor configured to operate in the security environment and control security of data using a first security key, and a secure memory configured to be operatively connected to the secure processor and store a second security key corresponding to the first security key. Various other embodiments are possible.

11 Claims, 11 Drawing Sheets

(51) Int. Cl.
  *G06F 12/14* (2006.01)
  *G06F 15/78* (2006.01)
  *H01L 23/00* (2006.01)
  *H04L 9/08* (2006.01)
(52) U.S. Cl.
  CPC ........ *G06F 15/7821* (2013.01); *H01L 23/576* (2013.01); *H04L 9/0869* (2013.01); *G06F 2212/1052* (2013.01)
(58) Field of Classification Search
  CPC .. G06F 21/72; G06F 21/79; G06F 2212/1052; G06F 2221/0755; G06F 7/588; H01L 23/576; H04L 9/0662; H04L 9/0869; H04L 9/0897; H04L 9/3228
  See application file for complete search history.

(56) References Cited

U.S. PATENT DOCUMENTS

| | | | |
|---|---|---|---|
| 10,534,882 | B2 | 1/2020 | McLean et al. |
| 2004/0158707 | A1* | 8/2004 | Kim .................... H04L 63/0435 713/153 |
| 2006/0090084 | A1* | 4/2006 | Buer .................... G06F 21/575 713/189 |
| 2011/0138192 | A1* | 6/2011 | Kocher ................ H04L 9/3236 713/189 |
| 2012/0079287 | A1* | 3/2012 | Leclercq .............. G06F 21/575 713/192 |
| 2013/0339739 | A1* | 12/2013 | Hueber ............... H04L 63/0435 713/171 |
| 2014/0020114 | A1 | 1/2014 | Bhatia et al. |
| 2014/0037093 | A1 | 2/2014 | Park et al. |
| 2014/0164725 | A1* | 6/2014 | Jang ..................... G06F 21/575 711/163 |
| 2014/0298043 | A1* | 10/2014 | Kambayashi ............. H04L 9/08 713/193 |
| 2015/0312036 | A1 | 10/2015 | Kumar |
| 2016/0028725 | A1 | 1/2016 | Benoit et al. |
| 2016/0239686 | A1 | 8/2016 | Kwon et al. |
| 2016/0330182 | A1* | 11/2016 | Jeon .................... A43B 3/0005 |
| 2017/0329995 | A1 | 11/2017 | Benoit et al. |
| 2018/0004506 | A1* | 1/2018 | Annapureddy ......... G06F 8/654 |
| 2018/0018461 | A1 | 1/2018 | Shin et al. |
| 2018/0365406 | A1 | 12/2018 | Elnekaveh et al. |
| 2019/0172047 | A1* | 6/2019 | Tan .................... G06Q 20/3263 |
| 2019/0318127 | A1* | 10/2019 | Pan ........................ G06F 21/60 |

FOREIGN PATENT DOCUMENTS

| | | |
|---|---|---|
| KR | 10-2017-0020137 A | 2/2017 |
| KR | 10-2018-0074967 A | 7/2018 |
| WO | 2017/222499 A1 | 12/2017 |

OTHER PUBLICATIONS

International Search Report dated Jun. 29, 2020, issued in International Application No. PCT/KR2020/003402.
Extended European Search Report dated Jul. 15, 2020, issued in European Application No. 20162344.4.

* cited by examiner

ELECTRONIC DEVICE INCLUDING SECURE INTEGRATED CIRCUIT

CROSS-REFERENCE TO RELATED APPLICATION(S)

This application is based on and claims priority under 35 U.S.C. § 119(a) of a Korean patent application number 10-2019-0028203, filed on Mar. 12, 2019, in the Korean Intellectual Property Office, the disclosure of which is incorporated by reference herein in its entirety.

BACKGROUND

1) Field

The disclosure relates to an electronic device including a secure integrated circuit.

2) Description of Related Art

Electronic devices (e.g., mobile terminals, smart phones, or wearable devices) may provide various functions and/or services. For example, electronic devices may provide functions for wireless communication using radio waves (e.g., Bluetooth mobile communication, wireless-fidelity (Wi-Fi) mobile communication, or Near-Field Communication (NFC) mobile communication), functions for mobile communication (e.g., third Generation (3G), fourth Generation (4G), or fifth Generation (5G)), functions of reproducing music or moving images, capturing functions, or navigation functions.

Recent electronic devices may store various pieces of information requiring security (e.g., payment information, credential information, and certificates). Various pieces of information requiring security may be stored, and thus interest in security of electronic devices is increasing. For example, a recent electronic device includes a built-in secure processor including an independent Random Access Memory (RAM) and an independent Read-Only Memory (ROM), and thus provides a security environment in which the electronic device and various pieces of information can be more safely protected.

The above information is presented as background information only to assist with an understanding of the disclosure. No determination has been made, and no assertion is made, as to whether any of the above might be applicable as prior art with regard to the disclosure.

SUMMARY

However, it may be difficult for a current secure processor to embed a memory which is configured to store data requiring security (hereinafter, "secure data") due to the difference between a manufacturing process of a processor and a manufacturing process of a memory. In this regard, an electronic device utilizes a partial area of a general memory, used in a general environment, as an area for storage of secure data. As described above, when the secure processor shares the general memory used in a general environment so as to store secure data in the general memory, the electronic device may fail to provide a completely independent security environment. For example, in an Operating System (OS) used in a general environment, the electronic device may access a memory area in which secure data is stored, and may delete secure data. Further, the electronic device may be vulnerable to a retransmission attack (replay attack).

An electronic device according to various embodiments allows separate provision of a memory operating in a security environment (e.g., a secure memory or a non-secure memory (a general memory) having no security function), and thus can provide an independent and safe security environment.

Aspects of the present disclosure are to address at least the above-mentioned problems and/or disadvantages and to provide at least the advantages described below. Accordingly, an aspect of the present disclosure is to provide an electronic device makes it possible to integrate a memory and a secure processor, which operate in a security environment, into one chip (e.g., System-on-Chip (SoC)), and provide the memory and secure processor integrated into one chip.

Additional aspects will be set forth in part in the description which follows and, in part, will be apparent from the description, or may be learned by practice of the presented embodiments.

In accordance with an aspect of the disclosure, an electronic device includes a secure Integrated Circuit (IC) configured as a System-on-Chip (SoC) and configured to provide a general environment and a security environment, wherein the secure IC includes a main processor configured to operate in the general environment, a secure processor configured to operate in the security environment and control security of data using a first security key, and a secure memory operatively connected to the secure processor and configured to store a second security key corresponding to the first security key.

In accordance with another aspect of the disclosure, an electronic device includes a secure Integrated Circuit (IC) which is of a System-on-Chip (SoC) type, the secure IC including a main processor configured to operate in a general environment and a secure processor configured to operate in a security environment and control security of data using a first security key, and a secure memory operatively connected to the secure processor of the secure IC and configured to store a second security key corresponding to the first security key.

In accordance with another aspect of the disclosure, an electronic device includes a secure Integrated Circuit (IC) configured as a System-on-Chip (SoC) and configured to provide a general environment and a security environment, wherein the secure IC includes a main processor configured to operate in the general environment, a secure processor configured to operate in the security environment and control security of data using a security key, and a non-secure memory operatively connected to the secure processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces FIG. 1 is a block diagram illustrating an electronic device 101 in a network environment 100 according to an embodiment of the disclosure.

Figure 1:
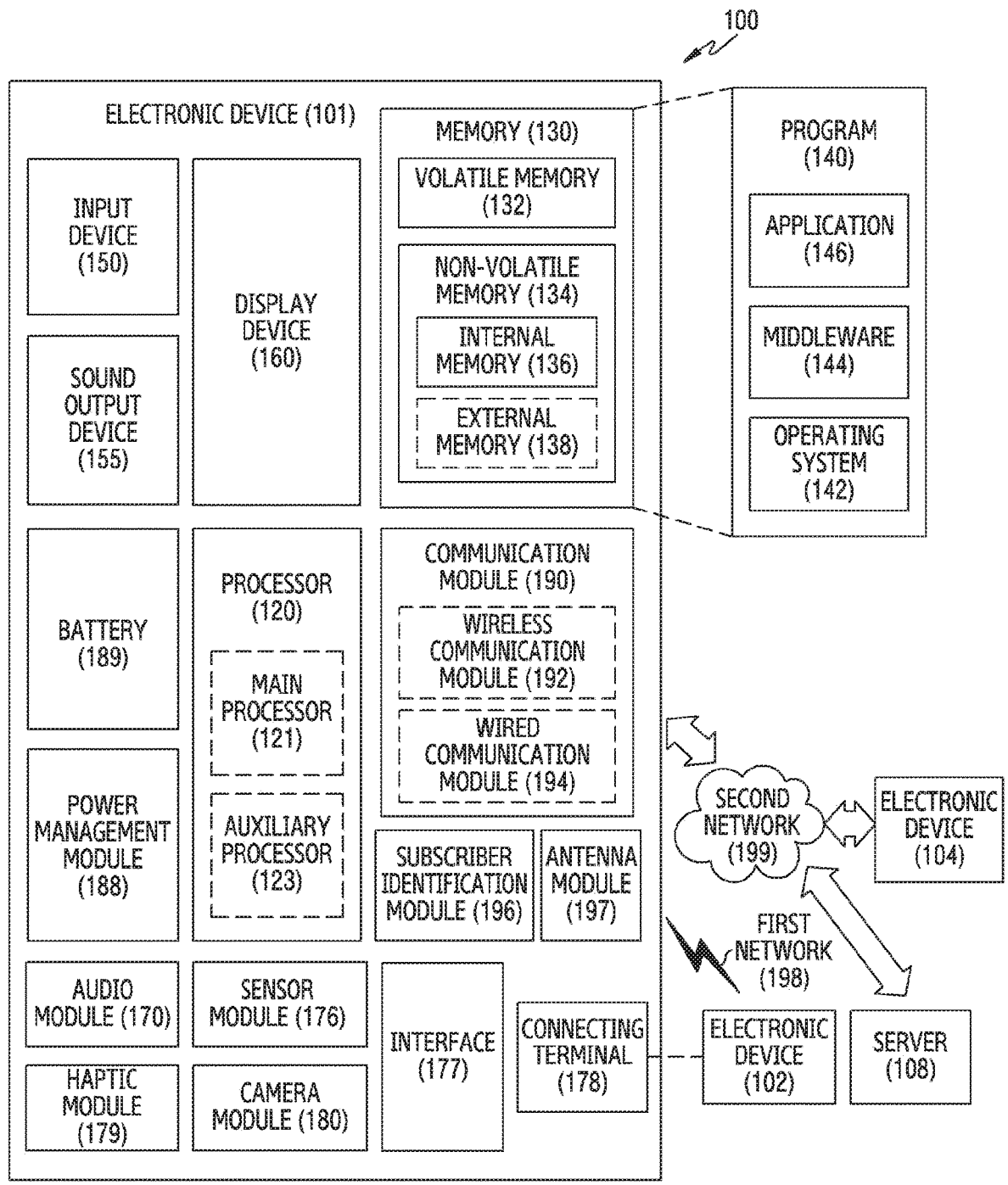
FIG. 1 is a block diagram illustrating a configuration of an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134. The non-volatile memory 134 may include an internal memory 136 or may be used to access an external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The auxiliary processor 123 may be a secure processor operating in a security environment (a Secure Execution Environment (SEE)). The processor 120 may be connected to a secure processor, and may further include a memory configured to store data requiring security (e.g., a general memory or a secure memory) (hereinafter, "second memory"). The main processor 121, the secure processor, and the second memory may be implemented as one chip (e.g., SoC).

According to some embodiments, the main processor 121 and the secure processor may be implemented as one chip, and the secure memory connected to the secure processor may be implemented as a separate element.

Figure 2:
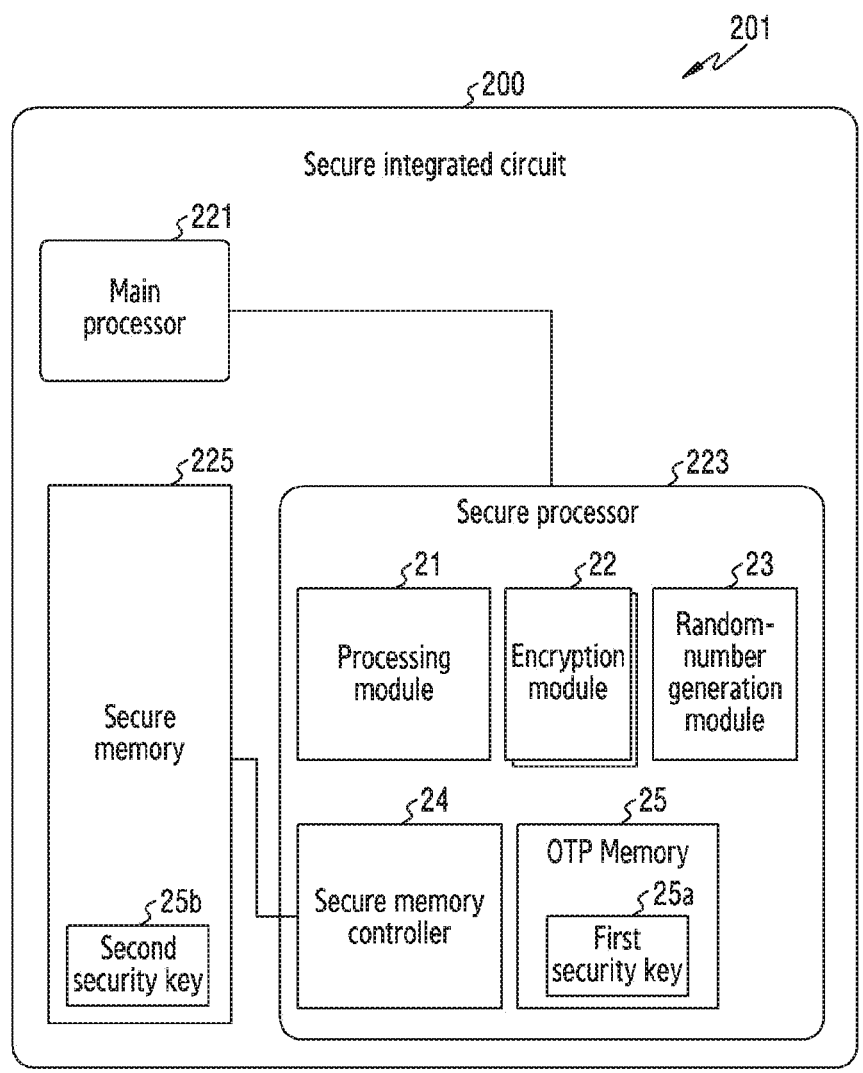
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 201 (e.g., the electronic device 101) according to an embodiment may include a secure Integrated Circuit (IC) 200 which is implemented as a SoC and provides a general environment (a rich execution environment) and a security environment (a secure execution environment).

The secure IC 200 may include a main processor 221 (e.g., the main processor 121), a secure processor 223 (e.g., the auxiliary processor 123), and a secure memory 225.

The main processor 221 may operate in a general environment. The main processor 221 may control data processing and an arithmetic operation in the general environment.

The secure processor 223 may be operatively connected to the main processor 221 so as to communicate with the main processor 221. For example, the secure processor 223 may receive, from the main processor 221, a request for invoking or initializing a security environment. The secure processor 223 may operate in a security environment. For example, the secure processor 223 may control the security (e.g., encryption) of data using a first security key 25a. The first security key 25a may be stored in a One-Time Programmable (OTP) memory 25.

The secure processor 223 may include a processing module 21, an encryption module 22, a random-number generation module 23, a secure memory controller 24, and the OTP memory 25.

The processing module 21 may control an overall operation of the secure processor 223. For example, the processing module 21 may control a security key generation procedure and a security communication (or encryption communication) procedure. This configuration will be described in detail below with reference to FIG. 4, FIG. 5, FIG. 6, FIG. 7, and FIG. 8.

The encryption module 22 may encrypt data requiring security. For example, when a security application (e.g., a payment application, such as Samsung Pay™, hereinafter "security application") executed in a security environment requests storage of data, the encryption module 22 may encrypt data by using the first security key 25a.

The random-number generation module 23 may generate a random number. For example, the random-number generation module 23 may generate a random number with entropy (e.g., a random number of 256 bits) that the secure processor 223 needs. The generated random number may be used to generate the first security key 25a and a second security key 25b.

The secure memory controller 24 may control the secure memory 225. For example, the secure memory controller 24 may record the second security key 25b in the secure memory 225, or may transmit the encrypted data to the secure memory 225.

The OTP memory 25 is a Non-Volatile Memory (NVM), and data may be recorded only once in the OTP memory 25. The OTP memory 25 may include the first security key 25a. A bit, which indicates whether the first security key 25a has been recorded, may be recorded in a designated area of the OTP memory 25.

The secure processor 223 may further include various elements. For example, the secure processor 223 may further include a secure cache, a ROM, a RAM, a memory controller, a security sensor, and the like.

The secure memory 225 may be operatively connected to the secure processor 223. For example, the secure memory 225 may perform encryption communication by using keys (e.g., the first security key 25a and the second security key 25b) pre-shared with the secure processor 223. The secure memory 225 may include (store) the second security key 25b corresponding to the first security key 25a. The first security key 25a and the second security key 25b may be generated based on a random number generated by the random-number generation module 23, and may have the same values. The secure memory 225 may be an NVM.

Although not illustrated in FIG. 2, the electronic device 201 according to an embodiment may further include a memory (e.g., the memory 130, hereinafter "first memory") which operates in a general environment and stores data not requiring security (general data or non-secure data). As described above, the electronic device 201 may separately include the secure memory 225 (hereinafter, "second memory") distinguished from the first memory, and thus can provide an independent and safe security environment. Further, an embodiment provides the second memory in the form of SoC, and thus can provide a safer security environment.

Figure 3:
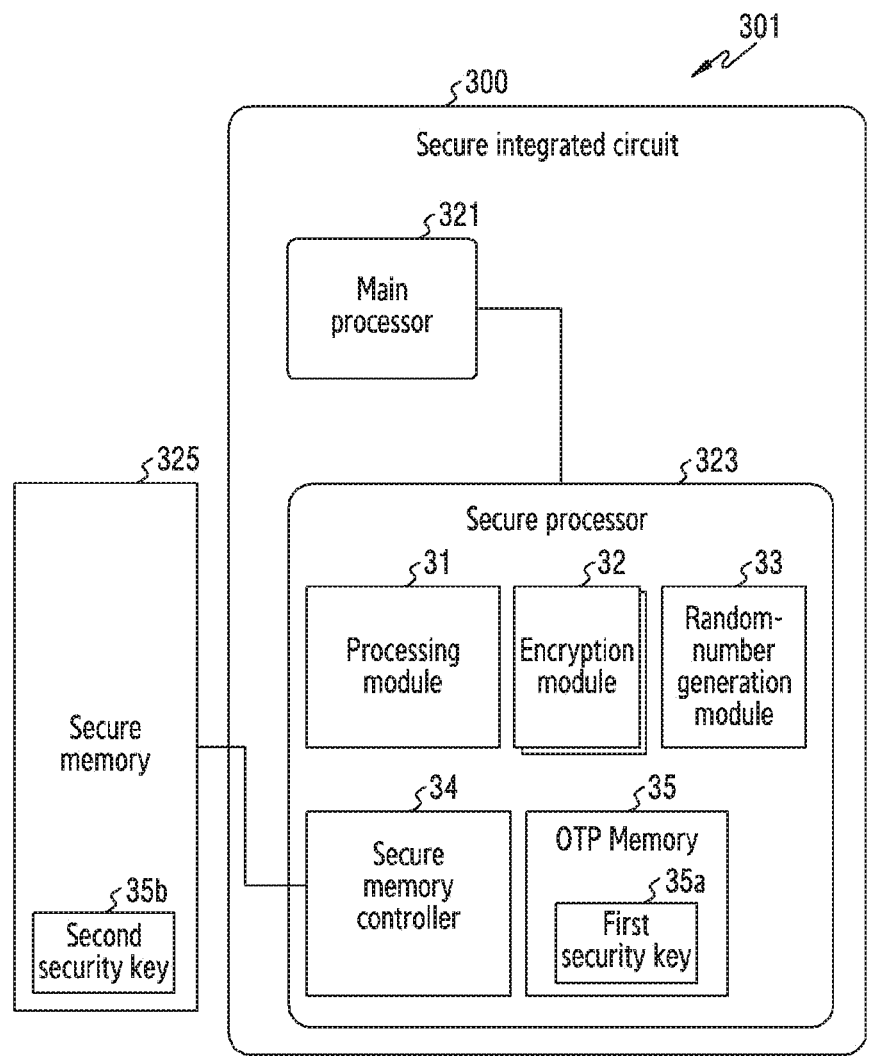
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, the electronic device 301 (e.g., the electronic device 101) according to another embodiment may include a secure IC 300 and a secure memory 325. In this example, the secure IC 300 may correspond to a SoC including a main processor 321 which operates in a general environment, and a secure processor 323 which operates in a security environment and controls the security of data using a first security key 35a.

The electronic device 301 according to another embodiment may include the secure memory 325 which is not integrated into the main processor 321 and the secure processor 323 but is a separate element. Except for this difference, the elements of the electronic device 301 operate similarly to those of the electronic device 201 illustrated in FIG. 2. For example, a processing module 31, an encryption module 32, a random-number generation module 33, a secure memory controller 34, an OTP memory 35, the first security key 35a, and a second security key 35b, which are illustrated in FIG. 3, may operate similarly to the processing module 21, the encryption module 22, the random-number generation module 23, the secure memory controller 24, the OTP memory 25, the first security key 25a, and the second security key 25b, which are illustrated in FIG. 2. Accordingly, in order to avoid repetition of the description made with reference to FIG. 2, a detailed description of the elements of the electronic device 301 will be omitted.

Hereinafter, for convenience of description, a method for generating a security key and a method for storing data, which are disclosed below in FIG. 4, FIG. 5, FIG. 6, and FIG. 7, will be described with reference to the electronic device 201 of FIG. 2. However, it will be apparent that the method for generating a security key and the method for storing data, disclosed below in FIG. 4, FIG. 5, FIG. 6, and FIG. 7, may be identically or similarly applied to the electronic device 101 of FIG. 1 or the electronic device 301 of FIG. 3.

Figure 4:
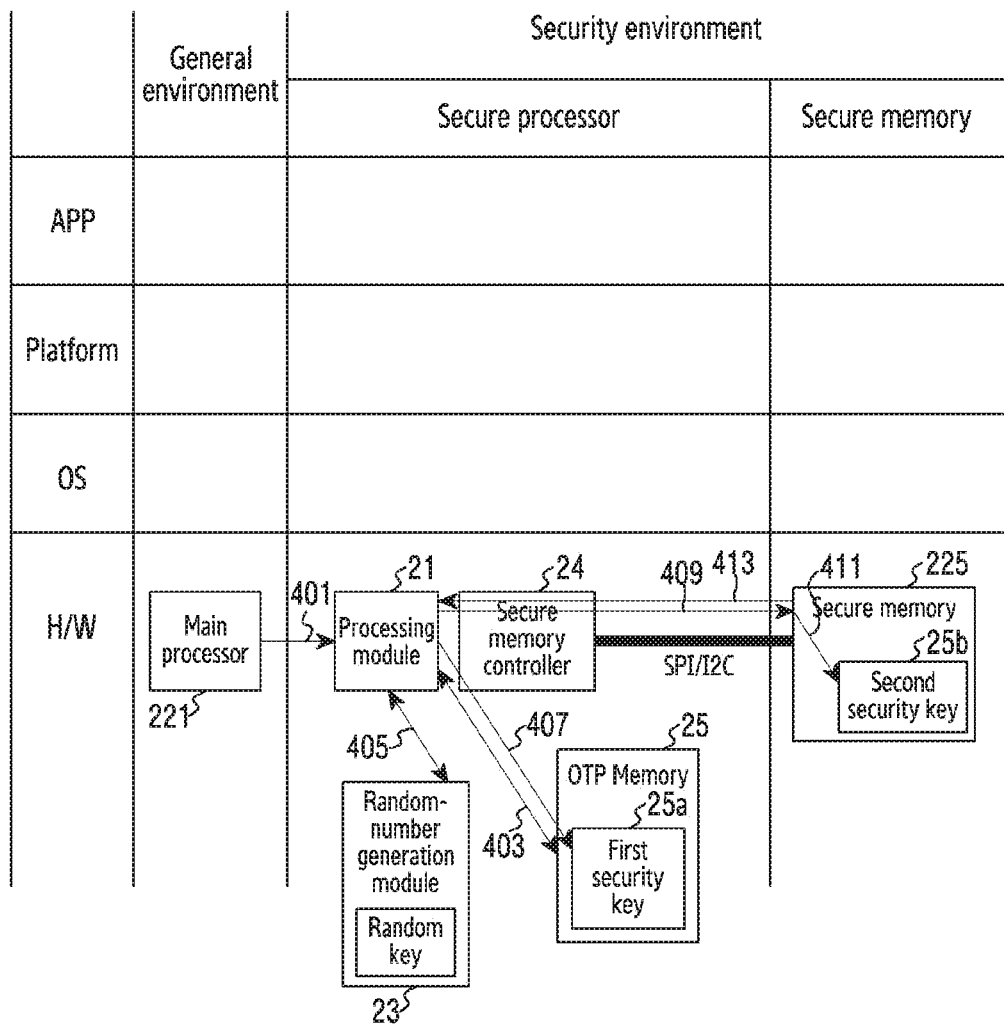
FIG. 4 is a diagram for explaining a method for generating and storing a security key by an electronic device according to an embodiment of the disclosure.

FIG. 4 is a diagram for explaining a method for generating and storing a security key by an electronic device according to an embodiment of the disclosure.

Referring to FIG. 4, in operation 401, the main processor 221 of the electronic device 201 according to an embodiment may inquire (ask a question) of the processing module 21 of the secure processor 223 about whether the first security key 25a is recorded (or fused). Such an inquiry may be made by the main processor 221 while a security environment is initialized at the time of the first booting in the manufacturing process of the electronic device 201 or after the electronic device 201 is manufactured. Alternatively, if a designated condition is satisfied, the inquiry may be made. For example, the inquiry may be made when a security environment is initialized due to the initialization, update, or the like of the electronic device 201. According to some embodiments, the main processor 221 may inquire of the processing module 21 about whether the second security key 25b is recorded.

In response to the inquiry, in operation 403, the processing module 21 may determine whether the first security key 25a is recorded in the OTP memory 25 (or the secure memory controller 24). For example, the processing module 21 may identify a bit value stored in a designated area of the OTP memory 25, and thus may determine whether the first security key 25a is recorded. According to some embodiments, the processing module 21 may identify a bit value stored in a designated area of the secure memory 225, and thus may determine whether the second security key 25b is recorded.

When it is determined in operation 403 that the first security key 25a is not recorded in the OTP memory 25 (or the secure memory controller 24), in operation 405, the processing module 21 may request the random-number generation module 23 to generate a random key, and may receive the generated random key from the random-number generation module 23. Although not illustrated, when it is determined in operation 403 that the first security key 25a is recorded in the OTP memory 25 (or the secure memory controller 24), the processing module 21 may determine whether the second security key 25b is recorded. When the second security key 25b is not recorded, the processing module 21 may proceed to operation 409. When the second security key 25b is recorded, the processing module 21 may terminate an operation of storing a security key.

In operation 407, the processing module 21 may record the first security key 25a in the OTP memory 25 based on the generated random key. For example, the processing module 21 may record the generated random key as the first security key 25a in the OTP memory 25. When recording of the first security key 25a is completed, the processing module 21 may record, in a designated area of the OTP memory 25, that the first security key 25a is recorded.

In operation 409, the processing module 21 may transmit the generated random key to the secure memory 225 via the secure memory controller 24. For example, the secure memory controller 24 may transmit the generated random key to the secure memory 225 via a communication channel (or a communication channel to which security is applied). The communication channel may be a communication channel of a Serial Peripheral Interface (SPI), Inter-Integrated Circuit (I2C), or Serial Communication Interface (SCI) scheme.

In operation 411, the secure memory 225 may record the second security key 25b based on the generated random key. For example, the secure memory 225 may record the generated random key as the second security key 25b in a secure area thereof. According to some embodiments, the random-number generation module 23 may immediately (directly) deliver the generated random key to the OTP memory 25, and thus may record the first security key 25a in the OTP memory 25.

In operation 413, after the secure memory 225 completes recording of the second security key 25b, the secure memory 225 may allow a result, which indicates completion of the recording, to return to the processing module 21 via the secure memory controller 24. The processing module 21 may store only the result, which indicates the completion of the recording of the second security key 25b, in a designated area (e.g., a designated area of the OTP memory 25). In response to the inquiry made by the main processor 221 as to whether the second security key 25b, the processing module 21 may identify a storage result, and may transmit the identified storage result to the main processor 221. Also, operation 407 and operations 409 to 411 may be performed simultaneously or in reverse order. Further, the first security key 25a may be recorded not in the OTP memory 25 but in the secure memory controller 24.

Figure 5:
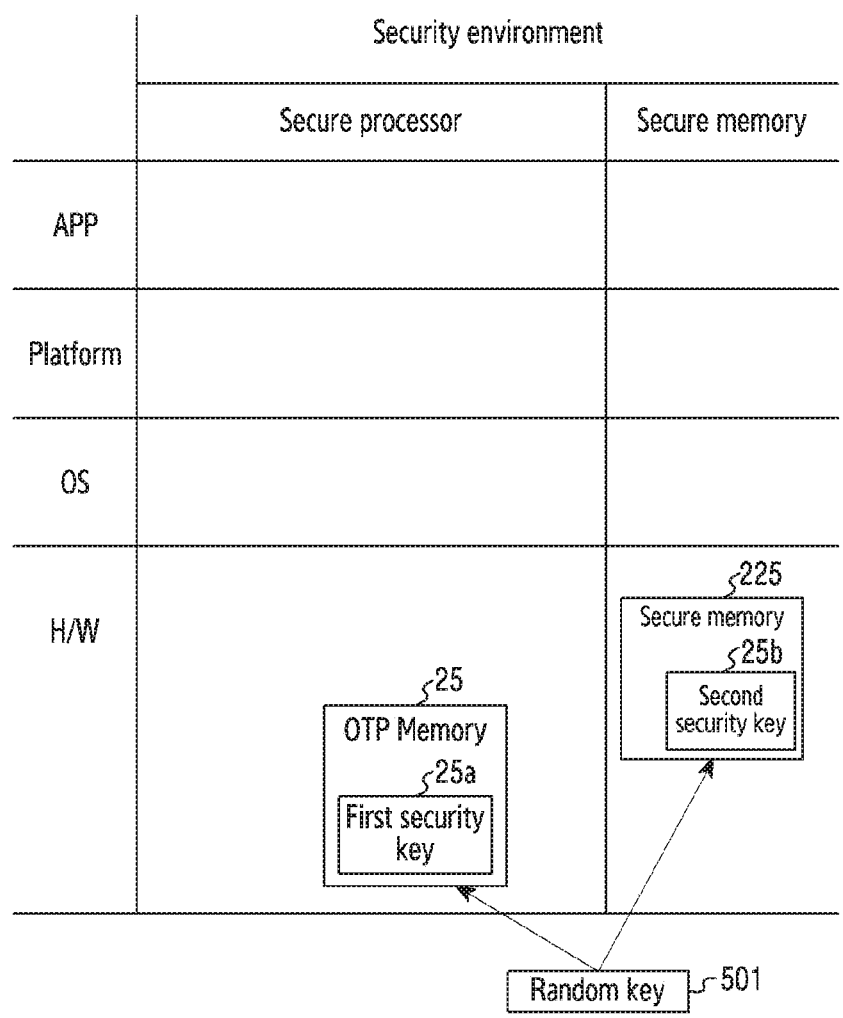
FIG. 5 is a diagram for explaining a method for generating and storing a security key by an electronic device according to an embodiment of the disclosure.

FIG. 5 is a diagram for explaining a method for generating and storing a key by an electronic device according to an embodiment of the disclosure.

Referring to FIG. 5, in the electronic device 201 according to another embodiment, the first security key 25a may be recorded in the OTP memory 25 or the secure memory controller 24 and the second security key 25*b* may be recorded in the secure memory 225, based on a random key 501 generated by an external device during manufacturing of the secure IC 200.

As in the case of the electronic device 301 of FIG. 3, when the secure memory 325 is included as a separate element, the first security key 35*a* may be recorded in the OTP memory 35 or the secure memory controller 34 based on the random key 501 generated by an external device during manufacturing of the secure IC 300, and the second security key 35*b* may be recorded in the secure memory 325 by the secure memory controller 34 based on the first security key 35*a* recorded in the OTP memory 35 or the secure memory controller 34 during initialization of a security environment.

Figure 6:
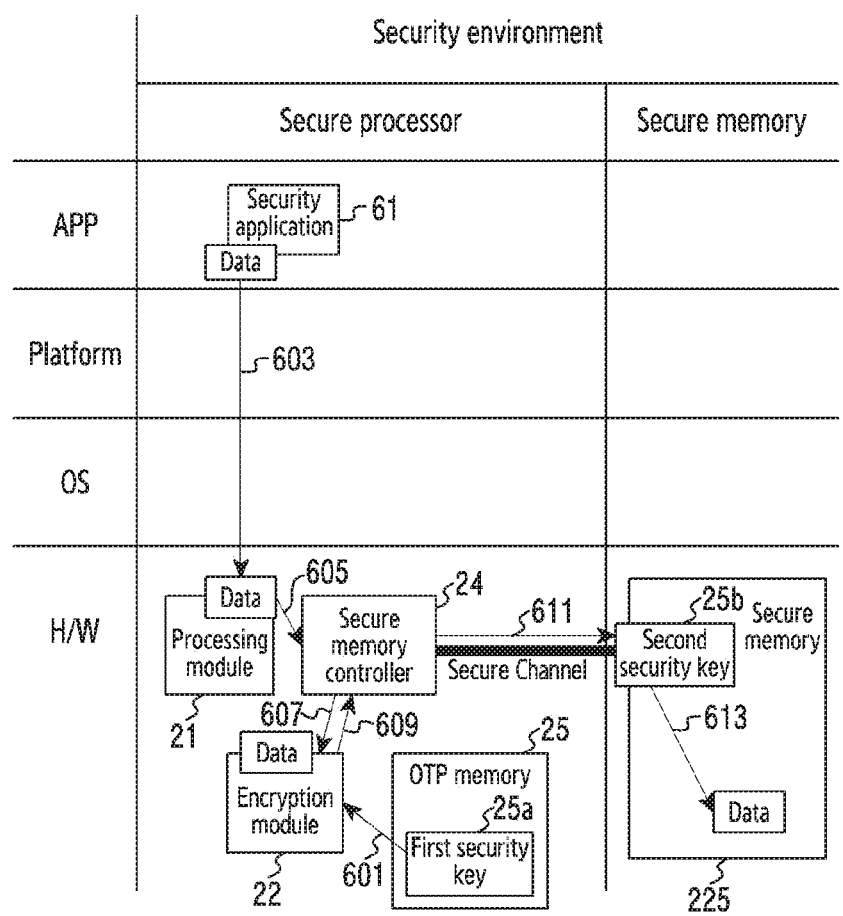
FIG. 6 is a diagram for explaining a method for storing data in a security environment according to an embodiment of the disclosure.

FIG. 6 is a diagram for explaining a method for storing data in a security environment according to an embodiment of the disclosure.

Referring to FIG. 6, the electronic device 201 according to an embodiment may configure a secure channel between the secure processor 223 and the secure memory 225 by using first security key 25*a* and the second security key 25*b*, and may perform encryption communication via the secure channel.

Based on a request of the main processor 221 and in response to invocation of a security environment by the secure processor 223, in operation 601, the encryption module 22 of the secure processor 223 may load the first security key 25*a* stored in the OTP memory 25 (or the secure memory controller 24). According to some embodiments, when the secure memory controller 24 includes a built-in encryption engine, the secure memory controller 24 may load the first security key 25*a* stored in the OTP memory 25 during invocation of a security environment.

In operation 603, an application (a security application) 61 executed in a security environment may request the processing module 21 to store data. In response to this request, in operation 605, the processing module 21 may transmit the data requested to be stored to the secure memory controller 24.

In operation 607, the secure memory controller 24 may request the encryption module 22 to encrypt the data, and in operation 609, may receive the encrypted data. According to some embodiments, the secure memory controller 24 of the secure processor 223 may use not the encryption module 22 but a built-in encryption engine to encrypt the data.

In operation 611, the secure memory controller 24 may transmit the encrypted data to the secure memory 225. For example, the secure memory controller 24 may transmit the encrypted data to the secure memory 225 via a secure channel.

In operation 613, the secure memory 225 may decode the transmitted encrypted data, and may store the decoded data. For example, the secure memory 225 may decode the encrypted data by using the second security key 25*b*, and may store the decoded data in a secure area thereof.

In the above-described embodiment, without accessing the first security key 25*a* by a security application or a secure OS side which runs in a security environment, the secure memory controller 224 of a hardware side may control encryption, and thus security can be improved.

Figure 7:
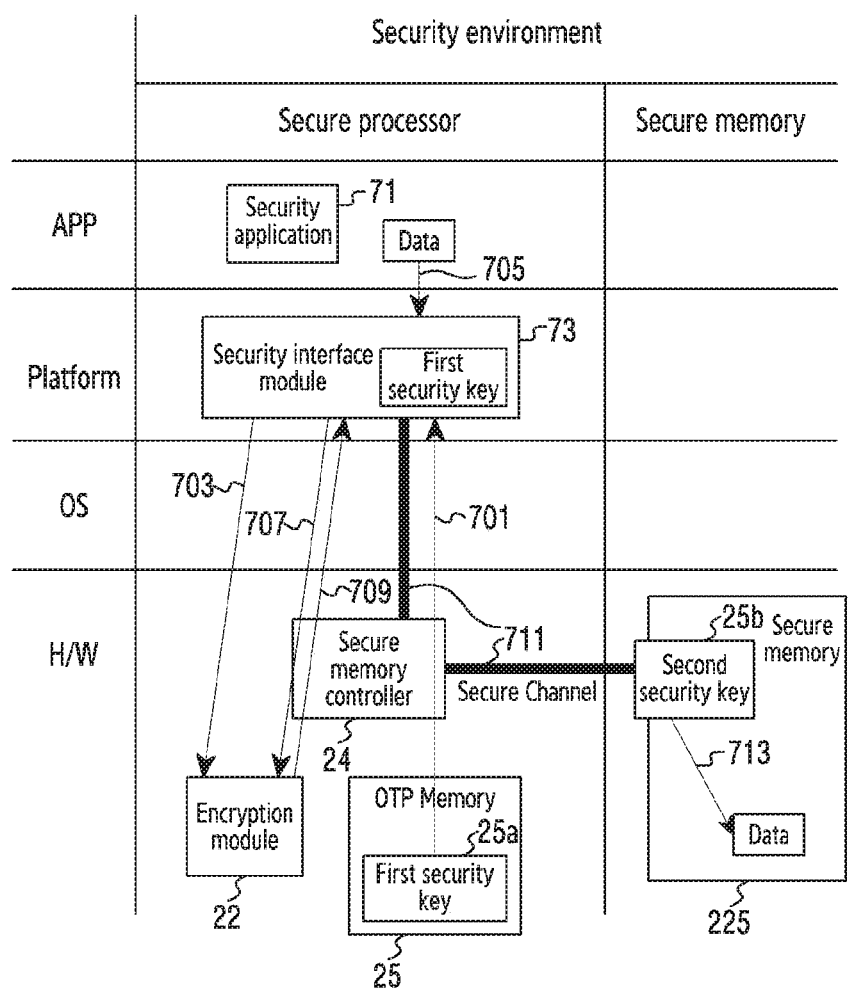
FIG. 7 is a diagram for explaining a method for storing data in a security environment according to an embodiment of the disclosure.

FIG. 7 is a diagram for explaining a method for storing data in a security environment according to an embodiment of the disclosure.

Referring to FIG. 7, the electronic device 201 according to an embodiment may control encryption communication by using a security interface module 73 which is software running on a secure OS side or a platform side. In this example, the secure memory controller 24 may serve as an interface between the security interface module 73 and the secure memory 225.

Based on a request of the main processor 221 and in response to invocation of a security environment by the secure processor 223, in operation 701, the security interface module 73 may load the first security key 25*a* stored in the OTP memory 25 (or the secure memory controller 24), and in operation 703, may transmit the loaded first security key 25*a* to the encryption module 22. According to some embodiments, during invocation of a security environment, the encryption module 22 may directly load the first security key 25*a* stored in the OTP memory 25, or may receive the first security key 25*a* via another element (e.g., the processing module 21 or the secure memory controller 24).

In operation 705, an application (a security application) 71 executed in a security environment may request the security interface module 73 to store data. In response to this request, in operation 707, the security interface module 73 may transmit the data requested to be stored to the encryption module 22 so as to request the encryption module 22 to encrypt the data, and in operation 709, may receive the encrypted data from the encryption module 22.

In operation 711, the security interface module 73 may transmit the encrypted data to the secure memory 225 via the secure memory controller 24. For example, the encrypted data may be transmitted to the secure memory 225 via a secure channel.

In operation 713, the secure memory 225 may decode the transmitted encrypted data, and may store the decoded data. For example, the secure memory 225 may decode the encrypted data by using the second security key 25*b*, and may store the decoded data in a secure area thereof.

According to various example embodiments of the disclosure, an electronic device (e.g., the electronic device 101, the electronic device 201) may comprise: a secure Integrated Circuit (IC) (e.g., the processor 120, the secure IC 200) configured as a System-on-Chip (SoC) and configured to provide a general environment and a security environment, wherein the secure IC may comprise: a main processor (e.g., the main processor 121, the main processor 221) configured to operate in the general environment; a secure processor (e.g., the auxiliary processor 123, the secure processor 223) configured to operate in the security environment and control security of data using a first security key (e.g., the first security key 25*a*); and a secure memory (e.g., the secure memory 225) configured to be operatively connected to the secure processor and store a second security key (e.g., the second security key 25*b*) corresponding to the first security key.

According to various example embodiments, the secure processor may comprise: a random-number generation module (e.g., the random-number generation module 23) configured to generate a random number having the pre-defined number of bits; a One-Time Programmable (OTP) memory (e.g., the OTP memory 25); a secure memory controller (e.g., the secure memory controller 24) configured to control the secure memory; and a processing module (e.g., the processing module 21) configured to be operatively connected to the random-number generation module, the OTP memory, and the secure memory controller. The processing module may be configured to: determine whether the first security key is recorded in the OTP memory, during initialization of the security environment; when it is determined that the first security key is not recorded, request the random-number generation module to generate a random key; record the generated random key as the first security key in the OTP memory or the secure memory controller; and transmit the generated random key to the secure memory via the secure memory controller so as to record the generated random key as the second security key in the secure memory.

According to various example embodiments, the processing module may be configured to identify a bit value stored in a designated area of the OTP memory so as to determine whether the first security key is recorded.

According to various example embodiments, the secure processor may further comprise an encryption module (e.g., the encryption module 22) configured to encrypt data by using the first security key.

According to various example embodiments, the encryption module may be configured to load the first security key from the OTP memory during invocation of the security environment. The secure memory controller may be configured to, when a security application (e.g., the security application 61) executed in the security environment requests storage of data, request the encryption module to encrypt the data, receive data encrypted using the first security key (encrypted data) from the encryption module, and transmit the received encrypted data to the secure memory via a secure channel; and the secure memory may be configured to decode the transmitted encrypted data by using the second security key and store the decoded data.

According to various example embodiments, the processing module may further comprise a security interface module (e.g., the security interface module 73) which is based on software. The security interface module may be configured to, during invocation of the security environment, acquire the first security key from the OTP memory and transmit the acquired first security key to the encryption module, when a security application (e.g., the security application 71) executed in the security environment requests storage of data, transmit the data requested to be stored to the encryption module and request encryption of the data, receive data encrypted using the first security key (encrypted data) from the encryption module, and transmit the received encrypted data to the secure memory via the secure memory controller. The secure memory may be configured to decode the transmitted encrypted data by using the second security key and store the decoded data.

According to various example embodiments, the secure processor ma y comprise a secure memory controller configured to control the secure memory, and an OTP memory. The first security key may be recorded in the OTP memory or the secure memory controller during manufacturing of the secure IC. The second security key is recorded in the secure memory during manufacturing of the secure IC.

According to various example embodiments of the disclosure, an electronic device (e.g., the electronic device 101, the electronic device 301) may comprise: a secure Integrated Circuit (IC) (e.g., the processor 120, the secure IC 300) which is of a System-on-Chip (SoC) type and comprises a main processor (e.g., the main processor 121, the main processor 321) configured to operate in a general environment and a secure processor (e.g., the auxiliary processor 123, the secure processor 323)configured to operate in a security environment and control security of data using a first security key (e.g., the first security key 35a); and a secure memory (e.g., the secure memory 325) configured to be operatively connected to a secure processor of the secure IC and store a second security key (e.g., the second security key 35b) corresponding to the first security key.

According to various example embodiments, the secure processor may comprise: a random-number generation module (e.g., the random-number generation module 33) configured to generate a random number having the pre-defined number of bits; a One-Time Programmable (OTP) memory (e.g., the OTP memory 35); a secure memory controller (e.g., the secure memory controller 34) configured to control the secure memory; and a processing module (e.g., the processing module 31) configured to be operatively connected to the random-number generation module, the OTP memory, and the secure memory controller. The processing module may be configured to: determine whether the first security key is recorded in the OTP memory, during initialization of the security environment; when it is determined that the first security key is not recorded, request the random-number generation module to generate a random key; record the generated random key as the first security key in the OTP memory or the secure memory controller; and transmit the generated random key to the secure memory via the secure memory controller so as to record the generated random key as the first security key in the secure memory.

According to various example embodiments, the processing module may be configured to identify a bit value stored in a designated area of the OTP memory so as to determine whether the first security key is recorded.

According to various example embodiments, the secure processor may further comprise an encryption module (e.g., the encryption module 32) configured to encrypt data by using the first security key.

According to various example embodiments, the encryption module may be configured to load the first security key from the OTP memory during invocation of the security environment. The secure memory controller may be configured to, when a security application (e.g., the security application 61) executed in the security environment requests storage of data, request the encryption module to encrypt the data, receive data encrypted using the first security key (encrypted data) from the encryption module, and transmit the received encrypted data to the secure memory via a secure channel. The secure memory may be configured to decode the transmitted encrypted data by using the second security key and store the decoded data.

According to various example embodiments, the processing module may further comprise a security interface module (e.g., the security interface module 73) which is based on software. The security interface module may be configured to, during invocation of the security environment, acquire the first security key from the OTP memory and transmit the acquired first security key to the encryption module, when a security application (e.g., the security application 71) executed in the security environment requests storage of data, transmit the data requested to be stored to the encryption module and request encryption of the data, receive data encrypted using the first security key (encrypted data) from the encryption module, and transmit the received encrypted data to the secure memory via the secure memory controller. The secure memory may be configured to decode the transmitted encrypted data by using the second security key and store the decoded data.

According to various example embodiments, the secure processor may comprise a secure memory controller configured to control the secure memory, and an OTP memory. The first security key may be recorded in the OTP memory or the secure memory controller during manufacturing of the secure IC. The processing module may be configured to, during initialization of the security environment, load a first security key recorded in the OTP memory or the secure memory controller and cause the secure memory controller to record the second security key in the secure memory based on the loaded first security key.

Figure 8:
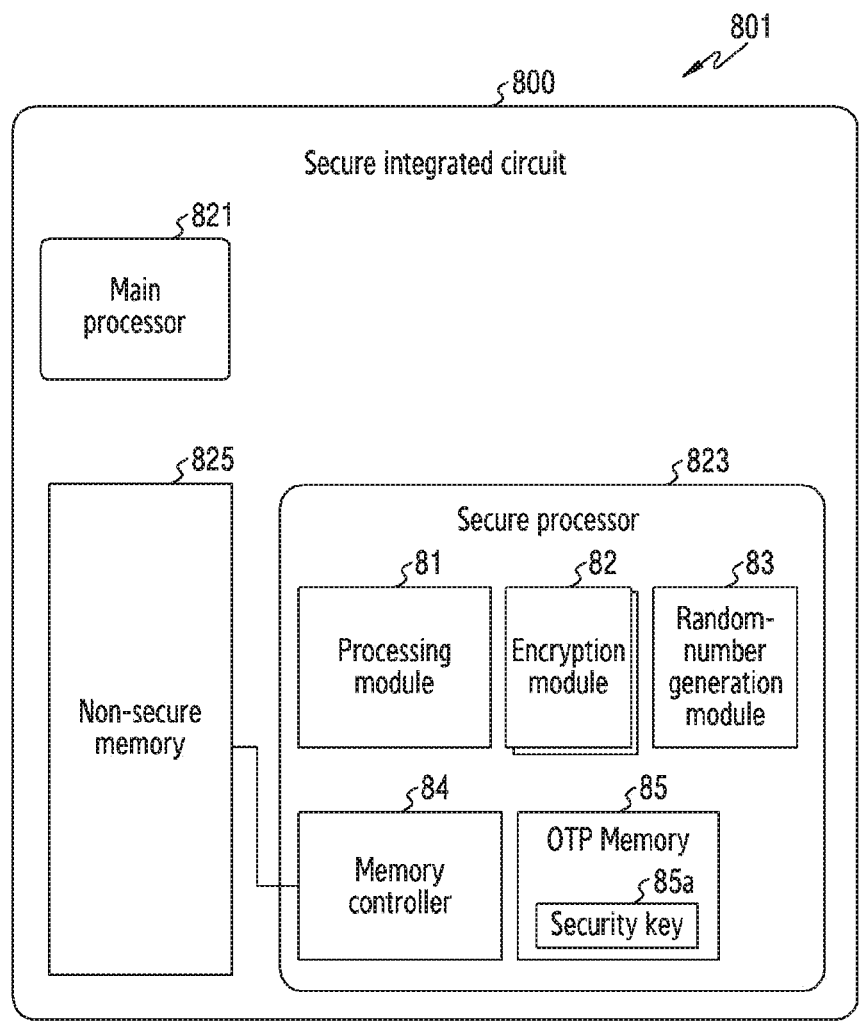
FIG. 8 is a block diagram illustrating a configuration of an electronic device according to an embodiment of the disclosure.

FIG. 8 is a block diagram illustrating a configuration of an electronic device according to still an embodiment of the disclosure.

Referring to FIG. 8, the electronic device 801 (e.g., the electronic device 101) according to an embodiment may include a secure IC 800 which is implemented as a SoC and provides a general environment and a security environment.

The secure IC 800 may include a main processor 821 (e.g., the main processor 121), a secure processor 823 (e.g., the auxiliary processor 123), and a memory 825 having no security function (hereinafter, "non-secure memory"). The secure processor 823 may include a processing module 81, an encryption module 82, a random-number generation module 83, a memory controller 84, and an OTP memory 85.

The secure IC 800 according to an embodiment is similar to the secure IC 200 of FIG. 2. However, the secure IC 800 may include a non-volatile and non-secure memory 825, and the secure processor 823 may include a general memory controller 84 which is not a secure memory controller. Further, since the electronic device 801 uses the non-secure memory 825, the electronic device 801 may store a security key 85a only in the OTP memory 85, and may store the encrypted data in the non-secure memory 825 by using the security key 85a.

The secure IC 800 according to an embodiment may use the non-secure memory 825, and thus may protect the non-secure memory 825 through various known technologies (e.g., Replay-Protected Memory Block (RPMB)) for protection of encrypted data.

Although not illustrated in FIG. 8, the electronic device 801 according to an embodiment may further include a memory (e.g., the memory 130, hereinafter "first memory") which operates in a general environment and stores data not requiring security (general data or non-secure data). As described above, the electronic device 801 may separately include the non-secure memory 825 (hereinafter, "second memory") distinguished from the first memory, and thus can provide an independent and safe security environment. Further, an embodiment provides the second memory in the form of SoC, and thus can provide a safer security environment.

Except for the above-described difference, the elements of the electronic device 801 operate similarly to those of the electronic device 201 illustrated in FIG. 2. Accordingly, in order to avoid repetition of the description made with reference to FIG. 2, a detailed description of the elements of the electronic device 801 will be omitted.

Figure 9:
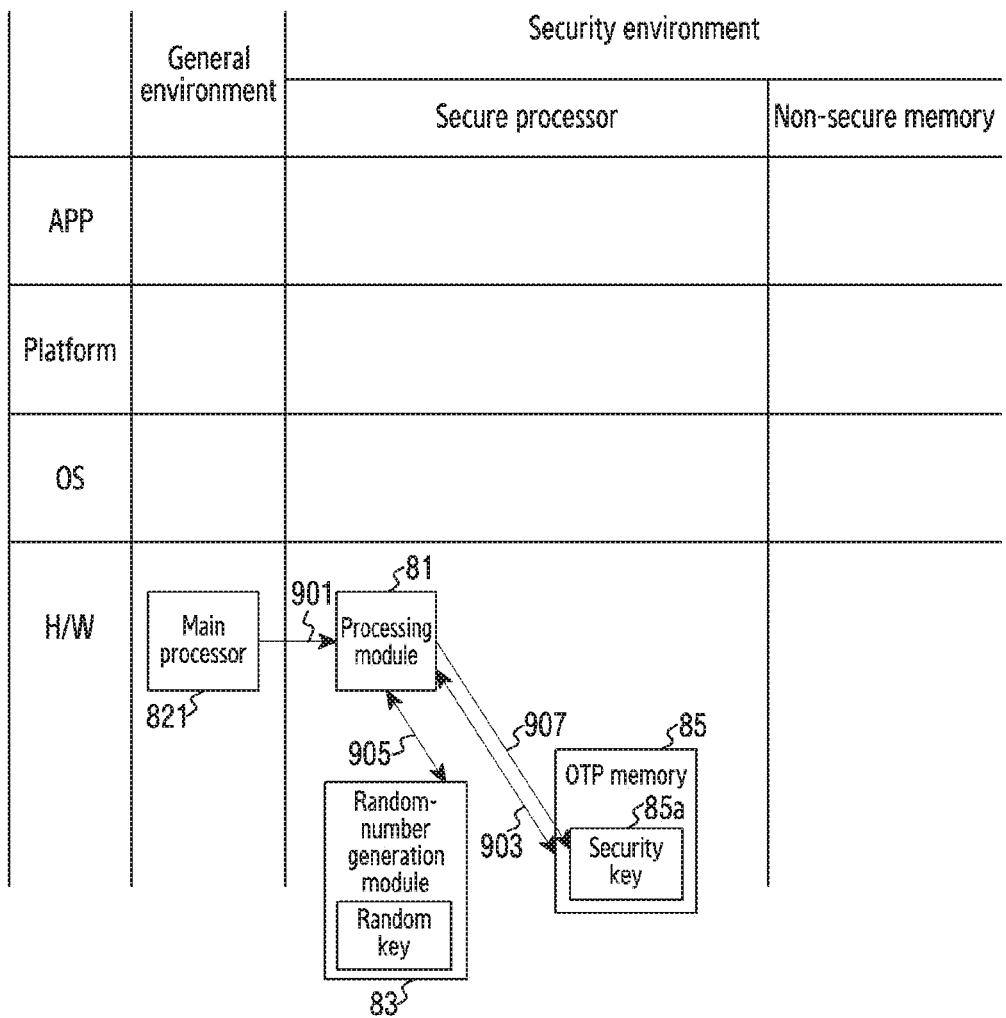
FIG. 9 is a diagram for explaining a method for generating and storing a security key by an electronic device according to an embodiment of the disclosure.

FIG. 9 is a diagram for explaining a method for generating and storing a security key by an electronic device according to an embodiment of the disclosure.

Referring to FIG. 9, in operation 901, the main processor 821 of the electronic device 801 according to still another embodiment may inquire (ask a question) of the processing module 81 of the secure processor 823 about whether the security key 85a is recorded (or fused). Such an inquiry may be made by the main processor 821 while a security environment is initialized at the time of the first booting in the manufacturing process of the electronic device 801 or after the electronic device 801 is manufactured. Alternatively, if a designated condition is satisfied, the inquiry may be made. For example, the inquiry may be made when a security environment is initialized due to the initialization, update, or the like of the electronic device 801.

In response to the inquiry, in operation 903, the processing module 21 may determine whether the security key 85a is recorded in the OTP memory 85. For example, the processing module 81 may identify a bit value stored in a designated area of the OTP memory 85, and thus may determine whether the security key 85a is recorded.

When it is determined in operation 903 that the security key 85a is not recorded in the OTP memory 85, in operation 905, the processing module 81 may request the random-number generation module 83 to generate a random key, and may receive the generated random key from the random-number generation module 83. Although not illustrated, when it is determined in operation 903 that the security key 85a is recorded in the OTP memory 85, the processing module 81 may terminate an operation of storing a security key.

In operation 907, the processing module 81 may record the security key 85a in the OTP memory 85 based on the generated random key. For example, the processing module 81 may control such that the generated random key is recorded as the security key 85a in the OTP memory 85. According to some embodiments, the random-number generation module 83 may immediately (directly) deliver the generated random key to the OTP memory 85 so as to record the security key 85a.

When recording of the security key 85a is completed, the processing module 81 may record, in a designated area of the OTP memory 85, that the security key 85a is recorded.

When the electronic device 801 uses RPMB, the OTP memory 85 may further store a key for the RPMB.

Figure 10:
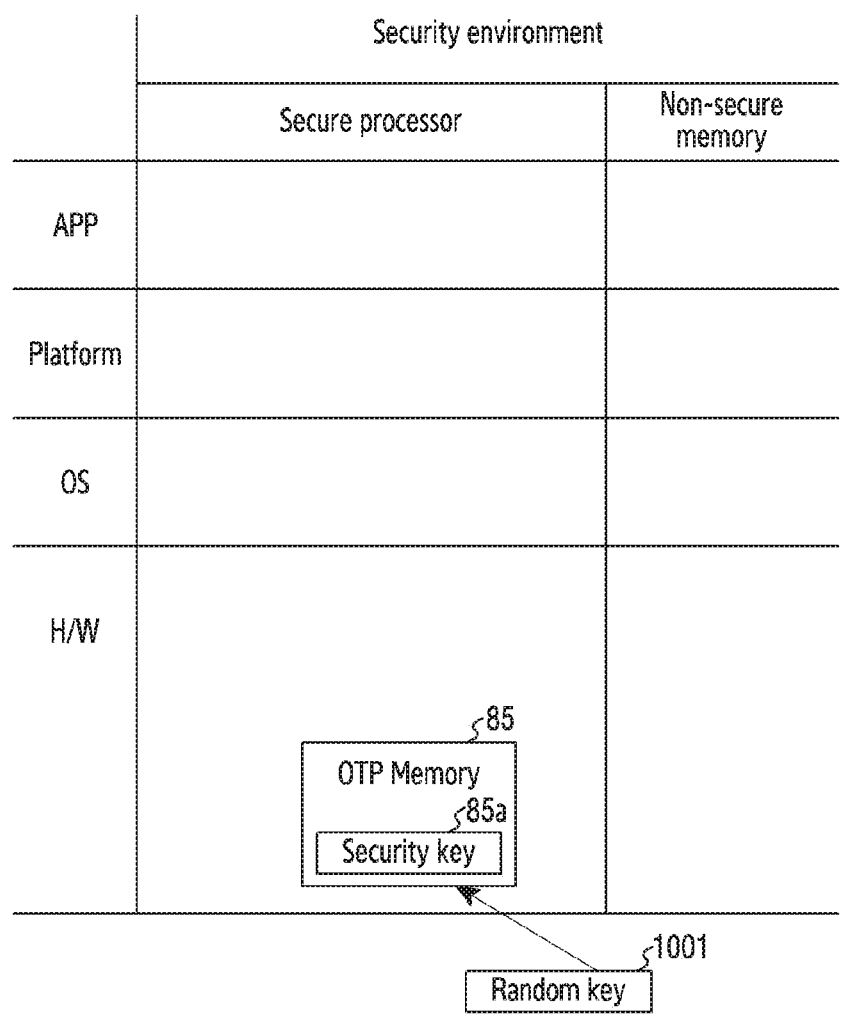
FIG. 10 is a diagram for explaining a method for generating and storing a security key by an electronic device according to an embodiment of the disclosure.

FIG. 10 is a diagram for explaining a method for generating and storing a security key by an electronic device according to an embodiment of the disclosure.

Referring to FIG. 10, the electronic device 801 according to yet another embodiment may record the security key 85a in the OTP memory 85 based on a random key 1001 generated by an external device during manufacturing of the secure IC 800.

Figure 11:
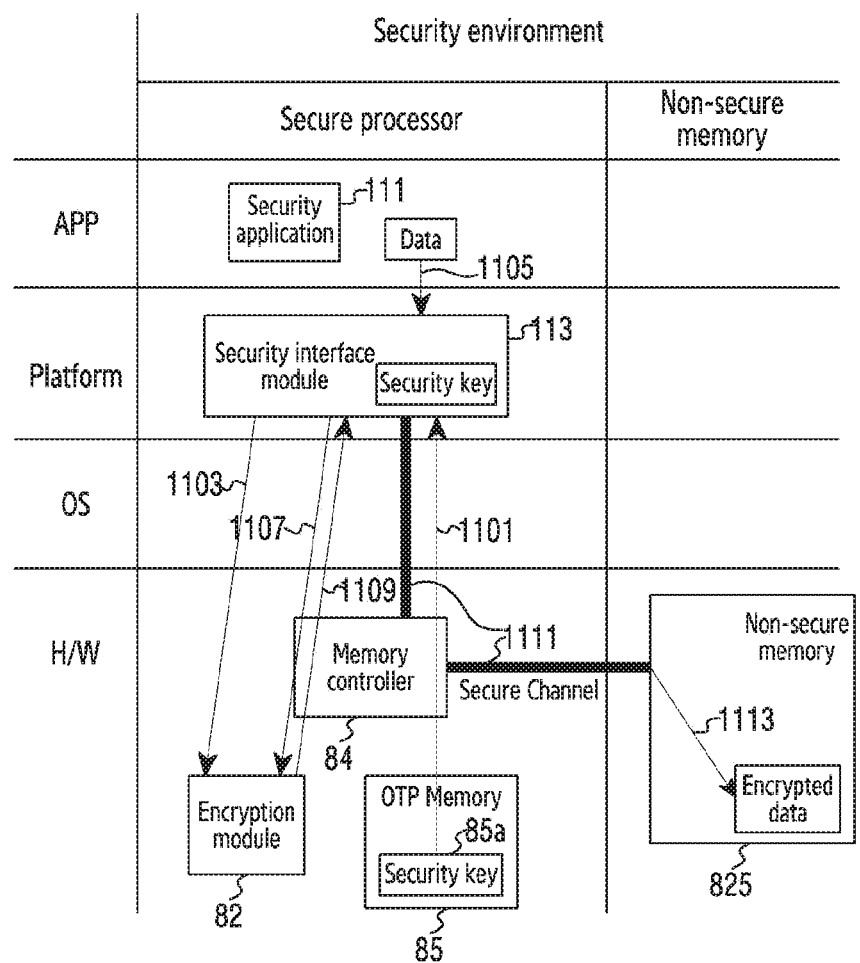
FIG. 11 is a diagram for explaining a method for storing data in a security environment according to an embodiment of the disclosure.

FIG. 11 is a diagram for explaining a method for storing data in a security environment according to an embodiment of the disclosure.

Referring to FIG. 11, in operation 1101, during invocation of a security environment, a secure interface module 113 of the electronic device 801 according to an embodiment may load the security key 85a stored in the OTP memory 85, and in operation 1103, may transmit the loaded security key 85a to the encryption module 82. According to some embodiments, during invocation of a security environment, the encryption module 82 may directly load the security key 85a stored in the OTP memory 85, or may receive the security key 85a via another element (e.g., the processing module 81 or the memory controller 84).

In operation 1105, an application (a security application) 111 executed in a security environment may request the security interface module 113 to store data. In response to this request, in operation 1107, the security interface module 113 may transmit the data requested to be stored to the encryption module 82 so as to request encryption of the data, and in operation 1109, may receive the encrypted data from the encryption module 82.

In operation 1111, the security interface module 113 may transmit the encrypted data to a memory 825 via the memory controller 84. The encrypted data may be transmitted to the memory 825 via a secure channel.

In operation 1113, the memory 825 may store the transmitted encrypted data. According to some embodiments, the encrypted data may be stored in a protected area (e.g., RPMB) of the memory 825. In this example, the security interface module 113 or the memory controller 84 may pre-load a key for access to the protected area (e.g., RPMB).

According to various example embodiments of the disclosure, an electronic device (e.g., the electronic device 101, the electronic device 801) may comprise: a secure Integrated Circuit (IC) (e.g., the processor 120, the secure IC 800) configured as a System-on-Chip (SoC) and configured to provide a general environment and a security environment. The secure IC may comprise: a main processor (e.g., the main processor 121, the main processor 821) configured to operate in the general environment; a secure processor (e.g., the auxiliary processor 123, the secure processor 823) configured to operate in the security environment and control security of data using a security key (e.g., the security key 85a); and a non-secure memory (e.g., the non-secure memory 825) configured to be operatively connected to the secure processor.

According to various example embodiments, the secure processor may comprise: a random-number generation module (e.g., the random-number generation module 83) configured to generate a random number having the pre-defined number of bits; a One-Time Programmable (OTP) memory (e.g., the OTP memory 85); and a processing module (e.g., the processing module 81) configured to be operatively connected to the random-number generation module and the OTP memory. The processing module may be configured to: determine whether the security key is recorded in the OTP memory, during initialization of the security environment; when it is determined that the security key is not recorded, request the random-number generation module to generate a random key; and record the generated random key as the security key in the OTP memory.

According to various example embodiments, the secure processor may further comprise: a memory controller (e.g., the memory controller 84) configured to control the non-secure memory; and an encryption module (e.g., the encryption module 82) configured to encrypt data by using the security key recorded in the OTP memory.

According to various example embodiments, the processing module may further comprise a security interface module (e.g., the security interface module 113) which is based on software. The security interface module may be configured to: during invocation of the security environment, acquire the security key from the OTP memory and transmit the acquired security key to the encryption module; when a security application (e.g., the security application 111) executed in the security environment requests storage of data, transmit the data requested to be stored to the encryption module and request encryption of the data; receive data encrypted using the security key (encrypted data) from the encryption module; and transmit the received encrypted data to the non-secure memory via the memory controller so as to store the encrypted data in the non-secure memory.

According to various example embodiments, the encrypted data nay be stored in a protected area of the non-secure memory.

According to various example embodiments, the secure processor may comprise an OTP memory. The security key may be recorded in the OTP memory during manufacturing of the secure IC.

Various embodiments separately provide a memory configured to store secure data, and thus can provide a completely independent and safe security environment. Further, various embodiments make it possible to integrate a secure processor and a secure memory configured to store secure data into one chip, and thus can provide a safer security environment.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138, the memory 930) that is readable by a machine (e.g., the electronic devices 101, 201, 301, 801). For example, a processor (e.g., the processor 120) of the machine (e.g., the electronic devices 101, 201, 301, 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a secure integrated circuit (IC) configured as a system-on-chip (SoC), the secure IC configured to provide a general environment and a security environment,
   wherein the secure IC comprises:
      a main processor configured to operate in the general environment;
      a secure processor configured to operate in the security environment and control security of data using a first security key; and
      a secure memory operatively connected to the secure processor and configured to store a second security key corresponding to the first security key,
   wherein the secure processor comprises:
      an encryption module configured to encrypt data by using the first security key;
      a random-number generation module configured to generate a random number having a pre-defined number of bits;
      a one-time programmable (OTP) memory;
      a secure memory controller configured to control the secure memory; and
      a processing module operatively connected to the encryption module, the random-number generation module, the OTP memory, and the secure memory controller,
   wherein the processing module is configured to:
      determine whether the first security key is recorded in the OTP memory, during initialization of the security environment, wherein the security environment is initialized at the time of a first booting of the electronic device due to initialization or update of the electronic device, and
      when it is determined that the first security key is not recorded:
         request the random-number generation module to generate a random key,
         record the generated random key as the first security key in the OTP memory, and
         transmit the generated random key to the secure memory via the secure memory controller so as to record the generated random key as the second security key in the secure memory,
   wherein the processing module further comprises a security interface module which is based on software running on a secure operating system or a platform,
   wherein the security interface module is configured to:
      during invocation of the security environment, acquire the first security key from the OTP memory and transmit the acquired first security key to the encryption module, and
      when a security application executed in the security environment requests storage of data:
         transmit the data requested to be stored to the encryption module and request encryption of the data,
         receive encrypted data encrypted using the first security key from the encryption module, and
         transmit the received encrypted data to the secure memory via the secure memory controller, and
   wherein the secure memory is further configured to:
      decode the transmitted encrypted data by using the second security key, and
      store the decoded data.

2. The electronic device of claim 1, wherein the processing module is further configured to identify a bit value stored in a designated area of the OTP memory so as to determine whether the first security key is recorded.

3. The electronic device of claim 1, wherein the processing module is further configured to identify a bit value stored in a designated area of the OTP memory so as to determine whether the second security key is recorded.

4. The electronic device of claim 1,
   wherein the first security key is recorded in the OTP memory or the secure memory controller during manufacturing of the secure IC, and
   wherein the second security key is recorded in the secure memory during manufacturing of the secure IC.

5. An electronic device comprising:
   a secure integrated circuit (IC) which is of a system-on-chip (SoC) type, the secure IC comprising:
      a main processor configured to operate in a general environment; and
      a secure processor configured to operate in a security environment and control security of data using a first security key; and
      a secure memory operatively connected to the secure processor of the secure IC and configured to store a second security key corresponding to the first security key,
   wherein the secure processor comprises:
      an encryption module configured to encrypt data by using the first security key;

a random-number generation module configured to generate a random number having a pre-defined number of bits;
a one-time programmable (OTP) memory;
a secure memory controller configured to control the secure memory; and
a processing module operatively connected to the encryption module, the random-number generation module, the OTP memory, and the secure memory controller,
wherein the processing module is configured to:
determine whether the first security key is recorded in the OTP memory, during initialization of the security environment, wherein the security environment is initialized at the time of a first booting of the electronic device due to initialization or update of the electronic device, and
when it is determined that the first security key is not recorded:
request the random-number generation module to generate a random key,
record the generated random key as the first security key in the OTP memory, and
transmit the generated random key to the secure memory via the secure memory controller so as to record the generated random key as the second security key in the secure memory,
wherein the processing module further comprises a security interface module which is based on software running on a secure operating system or a platform,
wherein the security interface module is configured to:
during invocation of the security environment, acquire the first security key from the OTP memory and transmit the acquired first security key to the encryption module, and
when a security application executed in the security environment requests storage of data:
transmit the data requested to be stored to the encryption module and request encryption of the data,
receive encrypted data encrypted using the first security key from the encryption module, and
transmit the received encrypted data to the secure memory via the secure memory controller, and
wherein the secure memory is further configured to:
decode the transmitted encrypted data by using the second security key, and
store the decoded data.

6. The electronic device of claim 5, wherein the processing module is further configured to identify a bit value stored in a designated area of the OTP memory so as to determine whether the first security key is recorded.

7. The electronic device of claim 5,
wherein the first security key is recorded in the OTP memory or the secure memory controller during manufacturing of the secure IC, and
wherein the processing module is configured to, during initialization of the security environment:
load the first security key recorded in the OTP memory or the secure memory controller, and
cause the secure memory controller to record the second security key in the secure memory based on the loaded first security key.

8. An electronic device comprising:
a secure integrated circuit (IC) configured as a system-on-chip (SoC) and configured to provide a general environment and a security environment,
wherein the secure IC comprises:
a main processor configured to operate in the general environment;
a secure processor configured to operate in the security environment and control security of data using a security key; and
a non-secure memory operatively connected to the secure processor, wherein the secure processor comprises:
a memory controller configured to control the non-secure memory;
an encryption module configured to encrypt data by using the security key;
a random-number generation module configured to generate a random number having a pre-defined number of bits;
a one-time programmable (OTP) memory; and
a processing module configured to be operatively connected to the memory controller, the encryption module, the random-number generation module and the OTP memory,
wherein the processing module is configured to:
determine whether the security key is recorded in the OTP memory, during initialization of the security environment, wherein the security environment is initialized at the time of a first booting of the electronic device due to initialization or update of the electronic device, and
when it is determined that the security key is not recorded:
request the random-number generation module to generate a random key, and
record the generated random key as the security key in the OTP memory,
wherein the processing module further comprises a security interface module which is based on software running on a secure operating system or a platform, and
wherein the security interface module is configured to:
during invocation of the security environment, acquire the security key from the OTP memory and transmit the acquired security key to the encryption module, and
when a security application executed in the security environment requests storage of data:
transmit the data requested to be stored to the encryption module and request encryption of the data,
receive encrypted data encrypted using the security key from the encryption module, and
transmit the received encrypted data to the non-secure memory via the memory controller so as to store the encrypted data in the non-secure memory.

9. The electronic device of claim 8, wherein the encrypted data is stored in a protected area of the non-secure memory.

10. The electronic device of claim 9, wherein the protected area of the non-secure memory area is protected based on a Replay-Protected Memory Block (RPMB) scheme.

11. The electronic device of claim 8,
wherein the security key is recorded in the OTP memory during manufacturing of the secure IC.

* * * * *